United States Patent [19]
Schmitt

[11] Patent Number: 5,881,677
[45] Date of Patent: Mar. 16, 1999

[54] SOLID AND LIQUID WASTE COLLECTION DEVICE

[76] Inventor: Kathleen Schmitt, 4472 Sudley Rd., Gainesville, Va. 20155-1233

[21] Appl. No.: 926,438

[22] Filed: Sep. 10, 1997

[51] Int. Cl.[6] .............................. A01K 1/015; A01K 1/01
[52] U.S. Cl. ............................................................. 119/526
[58] Field of Search .................................. 52/281, 282.1, 52/282.2, 403.1; 119/168, 169, 480, 526; 108/11, 67

[56] References Cited

U.S. PATENT DOCUMENTS

| | | | |
|---|---|---|---|
| 2,081,334 | 5/1937 | Kickenbush | 119/526 |
| 2,720,861 | 10/1955 | Stroup | 119/526 |
| 3,284,273 | 11/1966 | Prentice | 119/169 X |
| 4,147,129 | 4/1979 | Ruplen | 119/169 X |
| 4,250,834 | 2/1981 | Cheselka | 119/169 |
| 4,800,677 | 1/1989 | Mack | 119/169 X |
| 5,630,376 | 5/1997 | Ochi et al. | 119/169 |

*Primary Examiner*—Thomas Price
*Assistant Examiner*—James S. Bergin
*Attorney, Agent, or Firm*—Edward J. Kondracki, Esq.; Kerkam, Stowell, Kondracki & Clarke, P.C.

[57] ABSTRACT

A liquid-absorbing, rot-, chemical-, and skid-resistant mat fastened to an inner folding frame held in place within the area of use by an outer frame adapted to be secured to any surrounding wall. The inner frame is foldable and includes attachments by which the frame and mat, after being folded over itself, can be removed from the area of use by an overhead cabling or on a specially fitted wheeled trolley.

19 Claims, 8 Drawing Sheets

SOLID AND LIQUID WASTE COLLECTION DEVICE

BACKGROUND OF THE INVENTION

1. Field of the Invention

The present invention relates to a floor covering and more particularly to a readily portable framed, liquid-absorbing mat which minimizes solid or liquid waste collection and disposal costs. One application of this device would be for collection and disposal of animal waste from confined animals such as livestock.

2. Description of Related Art

Since time immemorial, straw or other livestock bedding material has been used as bedding for domestic animals. Once soiled, the bedding must be removed and disposed of, usually being stored near the stable then hauled away for use as compost and manure.

Bedding is today becoming relatively expensive and a regular supply is becoming difficult to obtain. Further, the use of bedding, even by farmers who grow their own, requires the use of special bedding-handling equipment, (e.g. bailers) and storage locations (e.g. barns), together with the labor of collecting and storing the bedding and for frequent bedding-handling throughout the year, i.e. mucking out and laying new bedding.

Animals are frequently housed in a barn containing individual stalls in which the floor is either a dirt, clay, gravel, or stonedust floor, or a wooden grating, or brick laid directly on earth, or concrete. More often than not, the animal occupying the stall defecates and urinates on the bedding.

Unfortunately, the bedding does not absorb the urine and dirt floors turn to mud easily upon an animals' urination. When the stall is cleaned, the removal of the mud forms holes in the dirt which require constant attention and which are not always easy to fill in.

Wooden gratings or "duckboards" and other plastic gratings are hard for lying on, fairly expensive, provide unsuitable footing for many kinds of livestock and further can interfere with the flow of water when washing down a barn. Plus, an animal may be cut with splinters, which if lodged under the skin, may fester.

Brick and concrete floors are not only hard, but they are also cold and generally require the use of large quantities of bedding requiring frequent replacement. Brick and concrete floors, also, are subject to the drawback of encouraging various ailments in the animals using them, in particular joints often become sprained, wrenched, deformed, rheumatic, or arthritic.

It has also been proposed to cover floors for stabling by juxtaposing layers formed by natural and/or synthetic material. However, the results obtained till now are not satisfactory. Manufactured stall floor covers do not have the resiliency nor the permeability necessary for the good accommodation of animals. They address only stall floor maintenance reduction, rather than facilitating the collection and disposal of waste.

IDENTIFICATION OF RELATED ART

Over the years, several patents have been granted to others for bedding used in animal stalls. Representative of these patents are U.S. Pat. Nos. 2,720,861; 4,333,981; 4,338,369; and 4,364,331.

U.S. Pat. No. 2,720.861, Stroup et al

This patent relates to a cow bedding device adapted to eliminate the use of bedding. A waterproof pad made up of layers of rubberized fabric possibly enclosing foam latex padding is attached at opposite ends to piping and bars which are clamped against the flooring by special clamps or clips mounted to stanchions. While the Stroup et al. patent recognizes the advantage of occasional portability for cleaning purposes, the device is labor intensive.

Further, waterproof pads of the type disclosed in the Stroup et al. patent are subject to puddling of urine which requires frequent cleaning to avoid unsanitary conditions.

U.S. Pat. No. 4,333,981, Winfield et al

The Winfield et al. patent discloses a stall floor and wall pad made up of a laminate of a foamed resin layer and a liquid impermeable layer. The Winfield pad is designed to resist abrasion. It addresses stall flooring protection rather than waste collection and disposal.

U.S. Pat. No. 4,364,331, Foenard

The Foenard patent discloses a stall pad comprising at least two felt like layers, needle punched together, having an abrasion resistant resin layer impregnated to the outside surface.

The later patents are representative of attempts that have been made to deal with the problem of solid and liquid waste collection and disposal as it relates to animal stall cleanliness and maintenance. None of the patents can be easily adapted to collection and disposal of waste both for and outside the livestock industry.

Other patents granted over the years include:

U.S. Pat. No. 4,502,415 Schwatrzkopff et al
U.S. Pat. No. 4,129,097 Schwatrzkopff et al
RE31,345 Schwatrzkopff et al
U.S. Pat. No. 3,066,646 Bramley
U.S. Pat. No. 2,081,334 Kickenbush Any liquid impermeable stall flooring, used by itself such as various rubber pads (typically provided to increase the animal's comfort, as compared with concrete, or to ease stall floor maintenance, in the case of dirt flooring) works reasonably well assuming a short stay by an animal held to a rather stationary position in the stall or stanchion. After short occupancy, the flooring is swept or flushed clean and any matting removed occasionally for more thorough cleaning. For extended (more than one hour or so) occupancy by an animal left free in a stall, however, stall flooring generally requires use of bedding such as straw, wood shavings, sawdust, etc. to keep the animal from extended direct contact with its own liquid waste products. Use of such bedding then requires manually cleaning the bedding. Many of the proposed labor-saving architectural plans require structural changes to the stabling which is beyond the budget of many livestock owners, and still requires manual cleaning of the bedding. Even using either more advanced stable flooring or built-in removal equipment, the problem of disposing of livestock waste mixed with bedding are increasing as environmental matters become better understood and population density increases in areas in which livestock are maintained, particularly in suburban and semi-rural areas.

Notwithstanding the numerous efforts that have been made and extraordinary amounts of labor and materials that have been devoted to hygienic and safe housing for livestock, development of various types of permanent or semi-permanent stall floorings, such as mattings or grids to reduce the need for maintaining the stall floor itself or for reducing the amount of bedding for comfort and sanitation, there still remains a great demand and need for a solid and liquid waste collection and disposal device which is not labor intensive, which can be easily and economically retrofitted to existing animal stalls and which reduces the problem of disposing of animal waste. There is also a demand for a device to collect and facilitate the removal and disposal of other kinds of waste.

SUMMARY OF THE INVENTION

The solid and liquid waste collection and disposal apparatus of the present invention greatly satisfies the above noted demand and needs. Furthermore, it is easy to install, and by selecting the materials from which it would be manufactured, it is easy to keep clean in a variety of environments, and offers a high resistance to wear from animal hooves or human or equipment traffic, together with great resiliency thereby ensuring a long useful life at a relatively low cost.

Accordingly, it is a primary object of the present invention to provide a safe, comfortable, and sanitary solid and liquid waste collection and disposal apparatus which virtually eliminates the need for livestock bedding, and hence the labor of providing and cleaning the bedding and maintaining the stall floor itself, and reduces the problem of disposing of solid and liquid waste.

Another object of the present invention is to provide a solid and liquid waste collection and disposal apparatus which enables stalls to be quickly and efficiently cleaned with a minimum of labor.

A further object of the present invention is to provide a portable mat and frame assembly for a livestock stall which is simple to manufacture, install and handle.

Another object of the present invention is to provide an apparatus to collect and dispose of a variety of forms of solid or liquid waste by using the basic configuration with materials specific to the type of waste to be collected and disposed of.

The present invention relates to a portable solid and liquid waste collection and disposal apparatus comprising liquid-absorbing, rot-, chemical- and skid-resistant material fastened to a folding frame, which is held in place within the area of use by a second outer frame, comprising framing bars removably affixed to the sides of the inner folding frame. This apparatus is provided with attachments by which the mat attached to the foldable frame, after being folded over itself, can be removed from the stall by means of overhead cabling or on a specially fitted wheeled trolley or dolly or merely by carrying it out of the area of use.

In accordance with my present invention, my solid and liquid waste collection and disposal apparatus comprises a foldable mat, a foldable inner frame, and removable framing bars forming an outer frame. The mat is made of any textile or material which is liquid-absorbing, rot-, chemical-, and skid-resistant, resilient, and selected according to the type of waste to be collected and disposed of. Any of a number of textiles or materials may be utilized to provide a safe and comfortable surface and to absorb liquid waste into its lower layers. A moisture barrier, such as any elastomeric sealant, may be applied to the underside of the mat to prevent liquid seeping through the mat. The mat is screwed or bolted to a foldable frame of smaller dimensions than the area into which the assembly is to be installed.

In accordance with a particular embodiment of the invention, the inner frame is made of any rigid or semi-rigid material, such as wood, or, preferably, a chemically inert synthetic material which can be worked with similarly to wood, such as any number of ultra-high molecular weight plastics or fiberglass. The corners of the inner frame may be fitted with braces to provide stability to the mat and frame assembly. The inner frame is further fitted with brackets which project at regular intervals along at least 2 sides. The intervals at which they project may vary according to the full size of the mat and inner frame assembly. The brackets attach to the lower side of the inner frame, which lies on the floor of the area in question, and extend outward from the inner frame toward any surrounding wall. The brackets then turn upward at a right angle, fitting flush against any surrounding wall. The intermittently placed brackets thus form a virtual channel to receive the outer frame's rigid bars fitting over the lower edge of the bracket and between the upright portion of the bracket and the mat and inner frame assembly. When installed for use, the mat and inner frame assembly is partially or wholly surrounded by an outer frame comprising removable rigid bars fitted into the brackets attached to the mat and inner frame assembly.

When fixed in the virtual channels formed by the brackets attached to the mat and inner frame assembly, the outer frame's rigid bars prevent the mat and inner frame assembly from folding, and provide a substantially flat, contiguous surface between the mat and inner frame assembly and any surrounding wall. The outer frame's rigid bars may be removably affixed to any surrounding walls so as to fix the mat and inner framing assembly into place in the area of use. When the outer frame's rigid bars are removed from the mat and inner frame assembly's virtual channels, the mat and frame assembly can be folded over itself and removed from the area of use for disposal or cleaning.

One edge or more of the mat and frame assembly can be fitted with pull straps, ropes, or handles to assist in folding the mat and inner frame assembly. Straps and buckles or hooks can be fitted along the hinged sides of the mat and inner frame assembly to prevent the assembly from unfolding during transport. Brackets or receiving slots can also be fitted along one edge of the mat and inner frame assembly to receive overhead cables which may be used to assist in removing the mat and frame assembly from the area of use. In such event, the area may be provided with a center beam which acts as a rail and from which is suspended a hoist chain. Once the mat and inner frame assembly are hoisted out of the area of use, the hoist may be moved along the overhead rail to any area designated where the assembly is disposed of or unfolded and cleaned.

Brackets for the rigid bars may advantageously be affixed to the area's wall or ceiling for convenient storage of the rigid bars when not in use. An appropriately resilient material, such as any of a number of foam rubbers, may also be advantageously placed in contact with the actual stall floor under the mat of the mat and inner frame assembly to increase comfort and to raise the top surface of the mat to the desired height, probably level with the height of the frame members. The inner and outer frames may be fitted with power-assistance devices to further ease portability. An anti-skid preparation may also be applied to some of the upper surface of the mat without interfering with the mat's liquid-absorption, if additional traction is desired.

BRIEF DESCRIPTION OF THE DRAWINGS

The invention will be readily apparent to those skilled in the art from the following description, given by way of example only, with reference to the accompanying drawings, wherein, like reference characters are used to identify like parts through the several views and wherein:

FIG. 2, comprising

Figure 1:
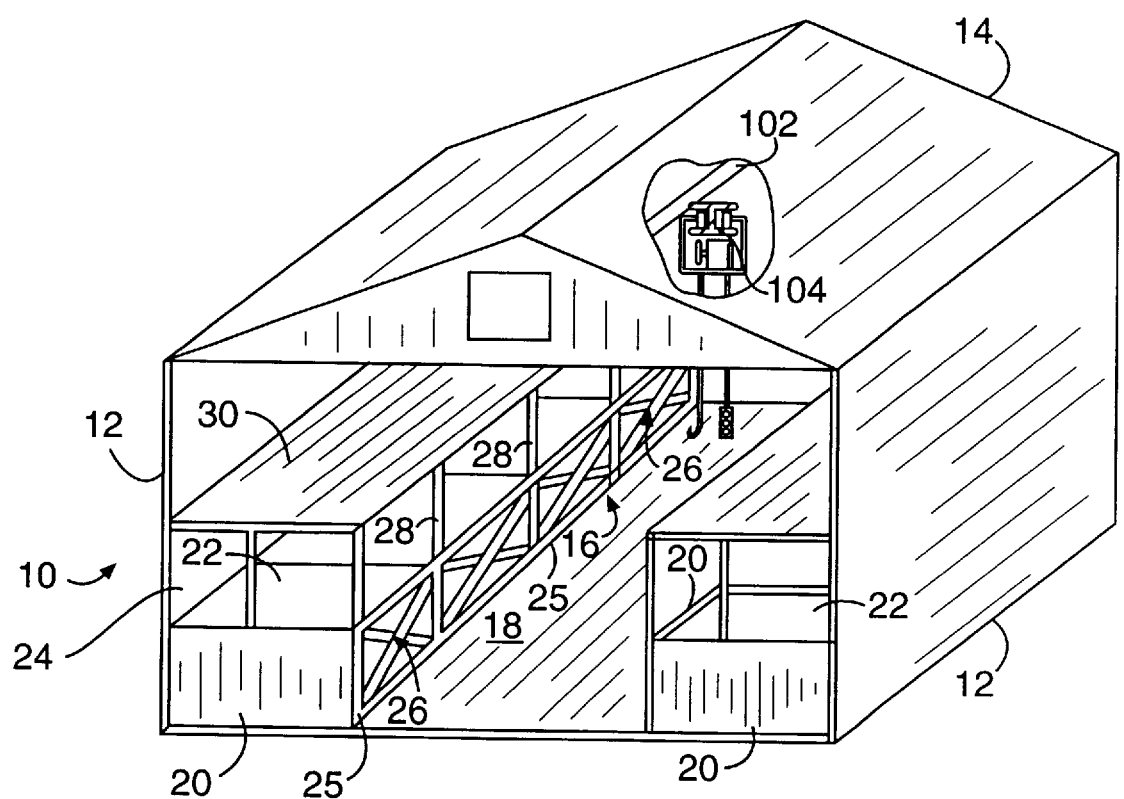
FIG. 1 is a diagrammatic representation of the barn with a fragmentary portion shown through the roof and with the front side removed to see the interior thereof.

DESCRIPTION OF THE PREFERRED EMBODIMENTS:

With reference to FIG. 1, there is illustrated a conventional barn 10 constructed over a dirt area and comprising front, rear and side barn walls 12 (only the side walls are illustrated) and an enclosing roof 14. In the drawing, the front wall is not shown in order that the interior layout of the barn may be seen. The interior of the barn comprises a plurality of adjacent stalls 16 on opposite sides of a central dirt pathway 18. Pathway 18 extends the length of the barn 10 to the front and rear walls, each of which conveniently include a door (not shown) for access and egress to and from the barn. Each stall includes side walls 20, 22, a rear wall 24, a front wall 25 extended partially across the front of the stall and a gate 26 hingely supported to a front wall 25 to complete the front of each stall. Access to the stall is through the front gate 26. Each of the side walls 20, 22, 24 and 25 may be of any suitable desired configuration, either of solid or open board and extend from the ground surface to a height of about four feet. However, the walls may extend upward any desired distance and may extend up to the loft 30.

Figure 4:
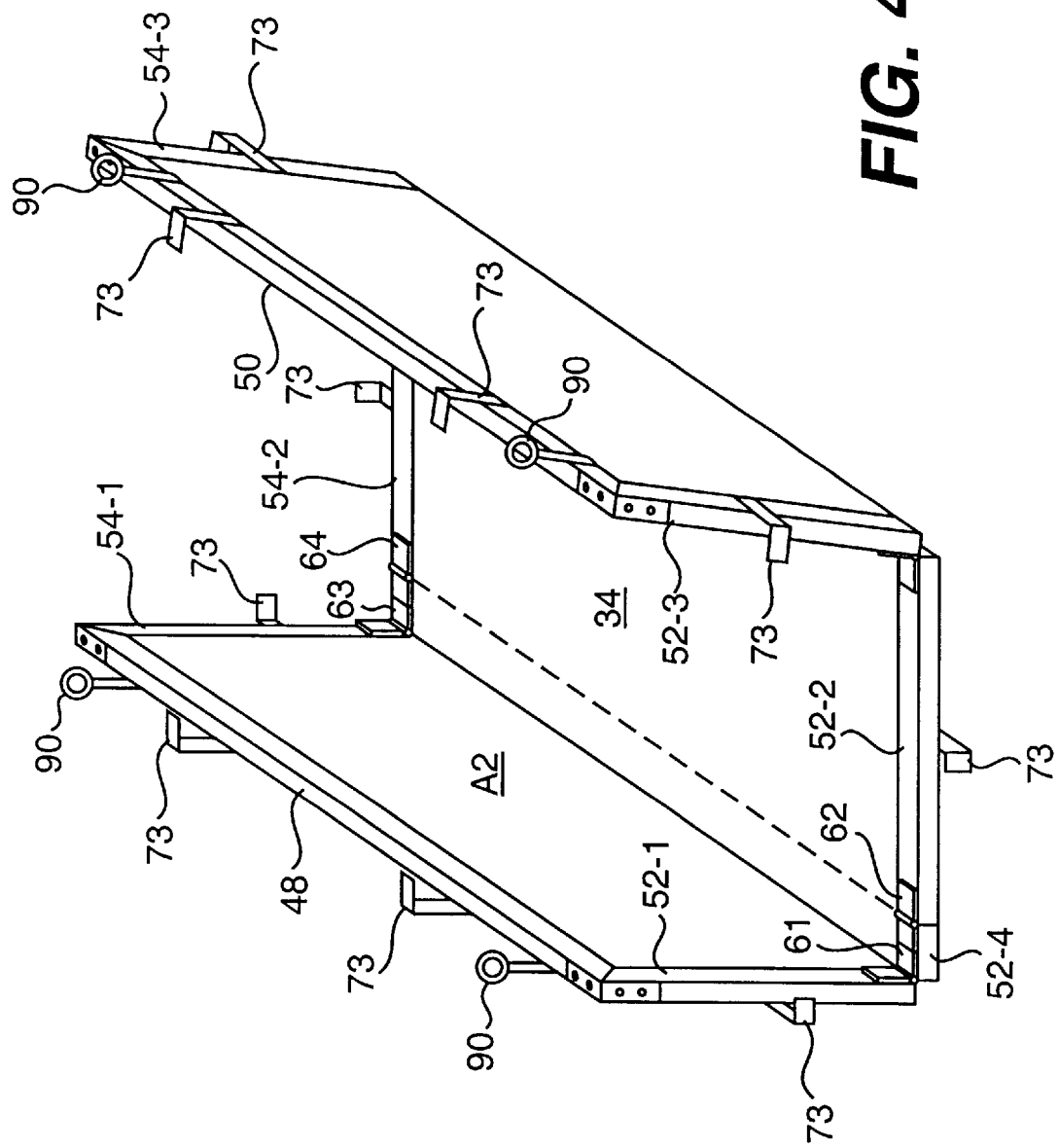
FIG. 4 is a diagrammatic illustration of the mat and inner frame of FIG. 2 partially folded in thirds.
Figure 5:
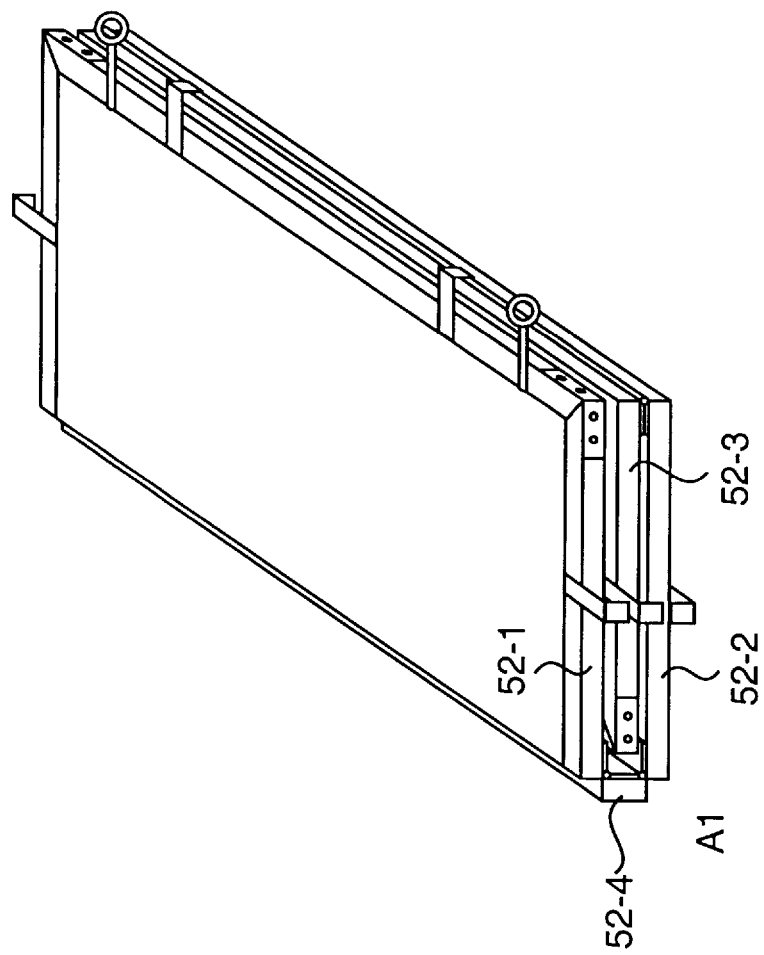
FIG. 5 is diagrammatic illustration of the mat and inner frame of FIG. 3 folded in thirds.
Figure 6:
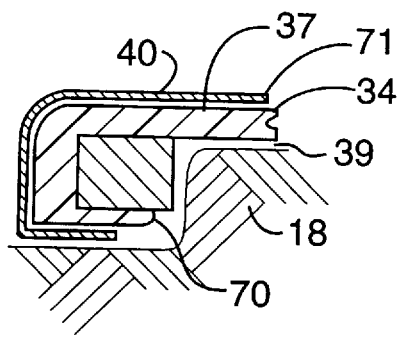
FIG. 6 is a partial view in cross section showing one manner of fastening a mat to the inner frame according to the invention.
Figure 10:
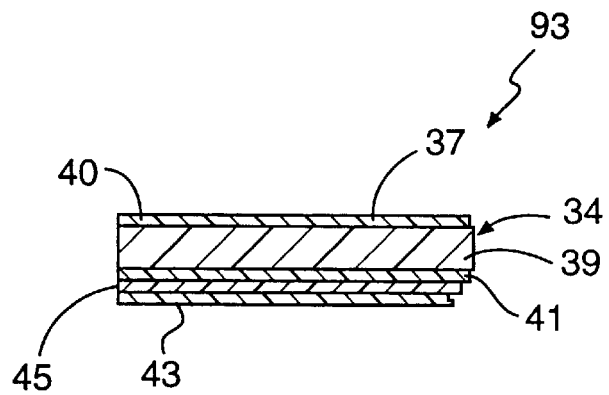
FIG. 10 is a fragmentary cross sectional view of a mat in accordance with the present invention.
Figure 9:
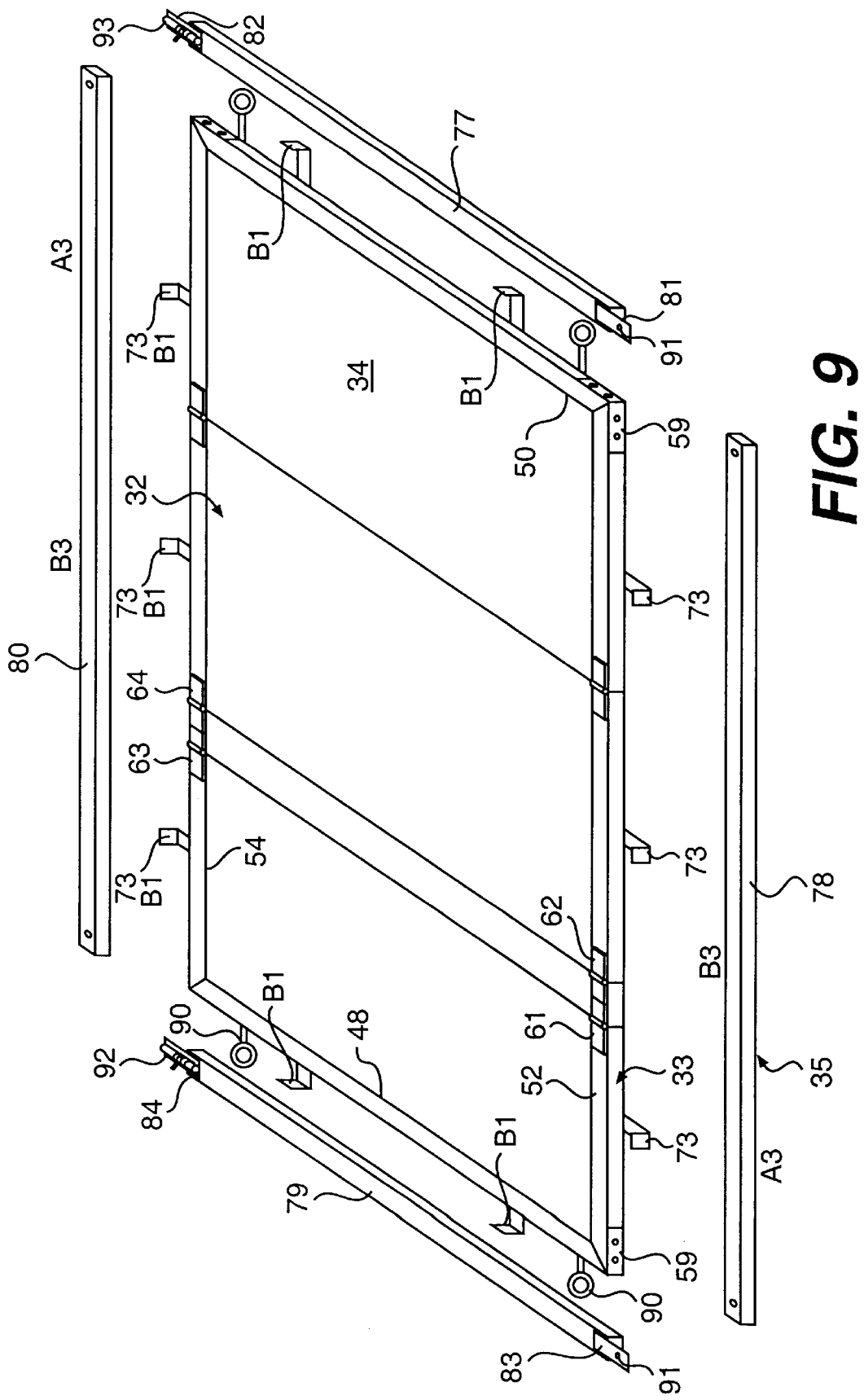
FIG. 9 is a top perspective view of a portable, framed, liquid absorbing mat of the present invention showing the outer frame comprising four members in a disassembled condition, but in a location relative to its assembled position around the inner frame.

In accordance with the present invention, each stall 16 is adapted to receive a portable liquid-absorbing mat 34 attached to an inner frame 33 as illustrated in FIGS. 2 through 5 and 9 and surrounded by an outer frame 35 as illustrated in FIG. 9. The inner frame 33 supports an outer frame 35 made up of four separate framing bars members 77, 78, 79 and 80 as shown in FIG. 9 in a manner to be hereinafter described. The portable inner frame 33 supports a flexible mat or pad 34 made from suitable liquid-absorbing, rot-, chemical- and skid-resistant material and may be fabricated from any of a number of commercially available textiles or materials. The characteristics of mat 34 are that the mat material is strong enough to withstand equipment, people or livestock standing and moving about on it, and is resistant to abrasion when being tread upon and being hauled out of its stall or moved about. Various materials suitable to various applications may include felts, canvases, industrial floor mats and man made natural woven or non-woven products, as some examples. Anti-skid preparations 40 can be applied to the top surface 37 of the mat 34 in any manner which does not interfere with the foldability or liquid-absorption capability of the mat, such as brushing or rolling such liquids or films in patterns. The preferred embodiment of the invention uses a non-woven polypropylene available from Leap Frog Technology, Item No. MR 2018, which has excellent acid- and skid-resistance properties which are desirable, but not absolutely essential for functioning of the mat 34. The polypropylene mat, further, has excellent absorption qualities. A mat in accordance with the present invention advantageously has a loft about ⅛ of an inch, and an area of about 12'×12', adapted to be received in a conventional stall, and has the capability of absorbing about 10 gallons of liquid. The mat can vary in size, generally taking the dimensions of the stall in which it is used. The top surface 37 of the pad 34 must be permeable to liquids, while the lower surface 39 of the pad 34, which may be placed in contact with the ground or in contact with a resilient material placed between the ground 18 and the mat 34, includes a moisture barrier 43 to prevent leaking of liquids through the mat onto the ground 18 or resilient material. As best shown in FIG. 10, the moisture barrier may be achieved by coating the underside of the mat with a latex sealant layer 41, followed by an elastomeric sealant (Elasto-Seal) 43 over a sheet of roofing fabric or felt 45. The sealant may be sprayed onto the surface or applied by a brush or roller. One advantage of using a roofing fabric or felt as an intermediate layer between moisture sealers is that it protects and strengthens the seams and is sufficiently flexible to enable the mat to be wrapped over a frame member 70 as shown in FIG. 6 to present a flat surface area. Other forms of moisture barriers can be utilized, such as for example, a non-permeable plastic sheet or film or a water proof tarp attached to the underside of the mat or by direct application of an elastomeric plastic film or resin.

Figure 2A:
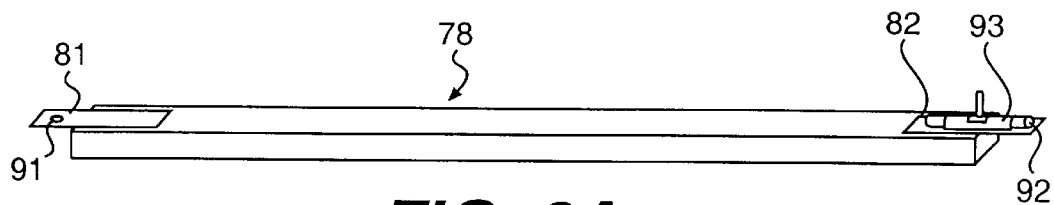
FIGS. 2A, 2B and 2C, is an illustration of an inner frame member and mat according to one embodiment of the invention with the inner frame hinged about its center so the mat and inner frame assembly can be folded in half as shown in FIG. 2B for easy removal from the area of use, and outer side frames, FIGS. 2A and 2C, comprising two parallel rigid framing bars provided with plate extensions and slide bolt mechanisms.
Figure 2B:
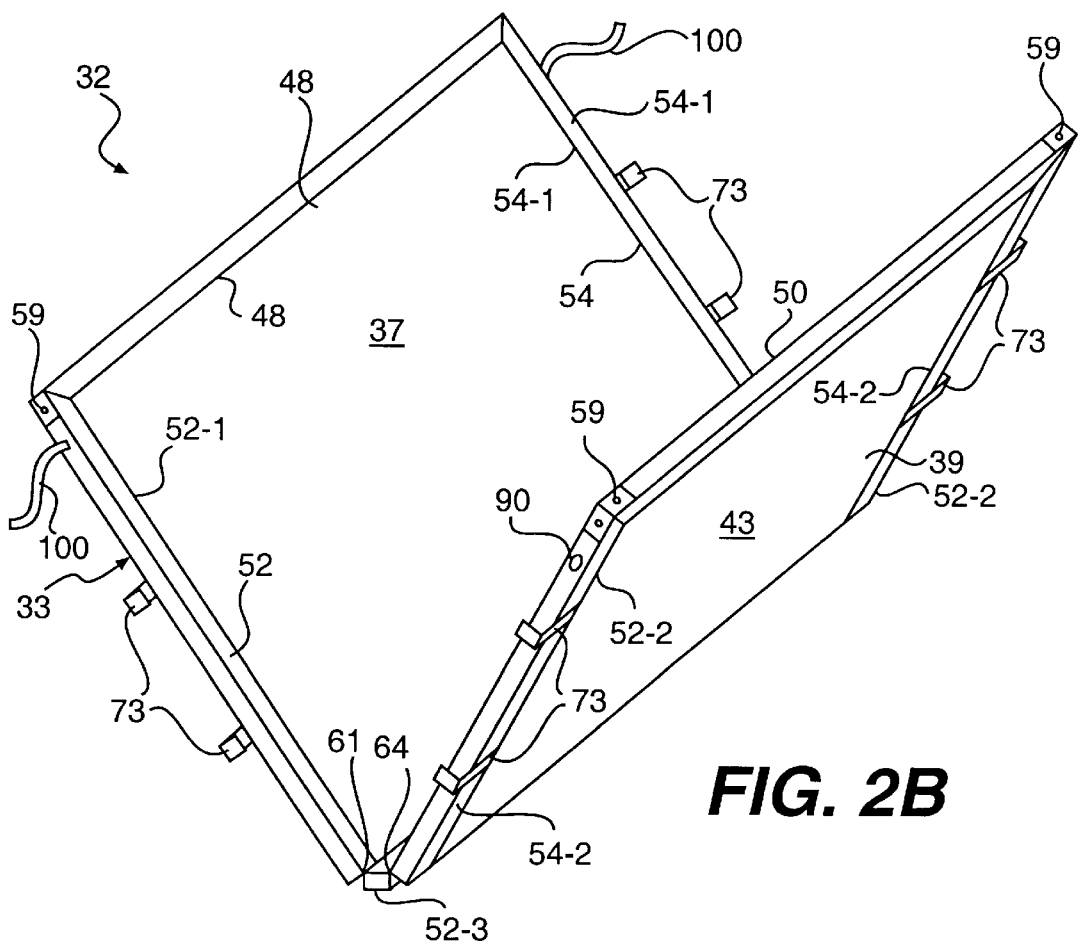
Figure 2C:
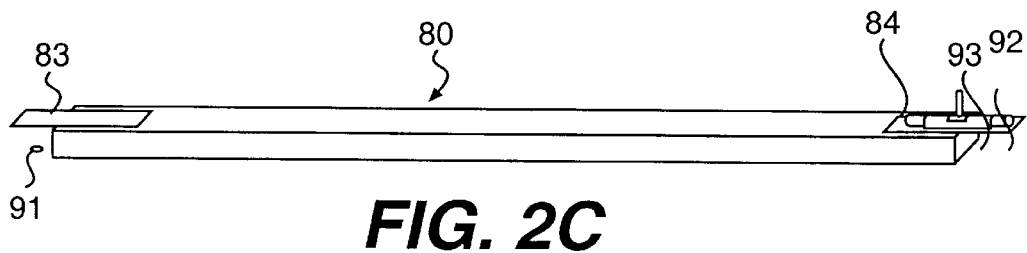
Figure 3:
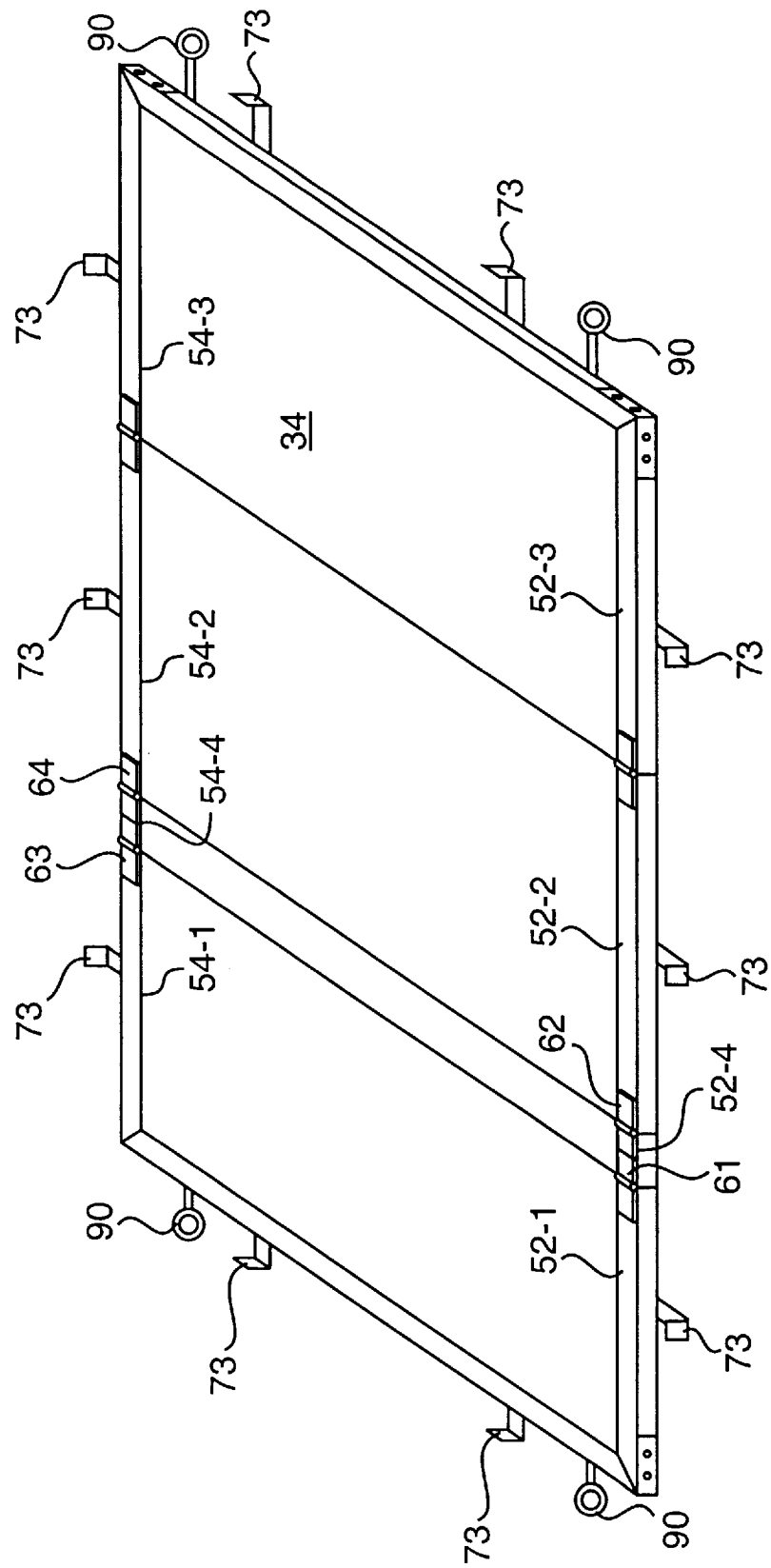
FIG. 3 is an illustration of the mat and inner frame assembly hinged at three locations along two parallel sides such that the frame can be folded in thirds for easy removal of mat and inner frame assembly from a stall.

In accordance with the present invention, mat 34 is affixed to the foldable inner frame 33 to make the mat and inner frame assembly 32. The mat and inner frame assembly 32 is somewhat smaller in dimension than the stall 16 into which the assembly is placed. To this end, the inner frame 33 comprises opposite end pieces or members 48, 50 and opposite side pieces 52, 54 connected to form, typically but not necessarily, a rectangular frame having its longitudinal axis parallel with the members 52, 54. End members 48, 50 are substantially parallel to the frame's center axis as shown in FIGS. 2 through 5, and are preferably contiguous in length and fabricated of rigid or semi-rigid material such as plastic, metal, fiberglass or wood. In its simplest form and depending upon the needs of the application being considered, each end member 48, 50 comprises a continuous length of material approximately ½" to 1" in height and approximately 1" to 2" in width and has an overall length which is approximately 6" less than the width of the stall. The parallel side pieces 52, 54 are constructed of like materials, but each side piece is made up of three or four sectional pieces, depending on whether the mat is to be folded in half as shown in FIG. 2B or in three sections as shown in FIG. 4. The embodiment of FIG. 3 has three sectional pieces 52-1, 52-2, 52-3 and 54-1, 54-2, 54-3 for each side. The embodiment of FIG. 4 has four sectional pieces 52-1, 52-2, 52-3, 52-4 and 54-1, 54-2, 54-3, 54-4. As shown in FIG. 4, the sectional side pieces 52-1, 52-2, 52-3, and 54-1, 54-2, 54-3 are approximately equal lengths spanning the majority of the distance to be covered. The remaining sectional side pieces 52-4, 54-4 are each approximately 4" long, and allow for easier folding of the mat and inner frame assembly into thirds. Sectional side pieces 52-1 and 54-1 are hinged to one end of adjacent sectional side pieces 52-4 and 54-4 by hinges 61 and 63 respectively. Sectional side pieces 52-2 and 54-2 are hinged to the other end of sectional side pieces 52-4 and 54-4 by hinge 64. The other ends of sectional side pieces 52-2 and 54-2 are hinged to sectional side pieces 52-3 and 54-3 by hinge 62. This enables the mat and inner frame assembly 32 to be folded in and upon itself in thirds about its center axis as shown in FIGS. 4 and 5. In an alternative embodiments, the mat and frame may be folded in half, fourths, etc. by utilizing appropriately spaced hinges.

Figure 7:
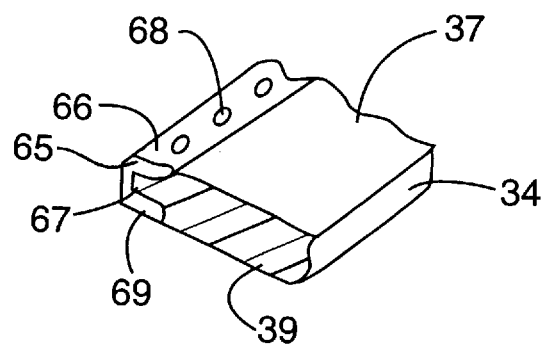
FIG. 7 is a partial view in cross section of an alternate manner of fastening the mat to the inner frame according to the invention.
Figure 8:
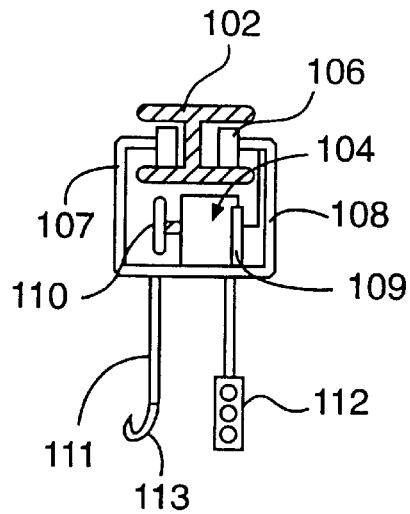
FIG. 8 is an illustration of a motor operated hoist mechanism which can be used to facilitate removal of the mat and inner frame assembly from a stall according to the present invention.

The rectangular inner frame pieces 48, 50, 52 and 54 provide a convenient and economical inner frame 33 to which the mat 34 may be secured. For greater stability, the corners of the inner frame 33 are advantageously reinforced by corner braces 59, but the corners could easily be of alternative construction such as tongue and groove, undercut and overlapping pieces, glued and screwed. Alternatively, the inner frame 33 may be fabricated of C shaped channel sections 66 as shown in FIG. 7, which enable the mat 34 to be securely fastened within the channel 66 by rivets 68 or with the application of an adhesive.

The preferred method of fastening the mat 34 to the inner frame 33 is shown in FIG. 6, wherein mat 34 is wrapped about a frame member 70 and secured to the bottom side of the frame member 70 so as to present a relatively flat surface 71 without protrusions. The height of the frame member 70 or C shaped channel member 66 may be minimized by using a material of greater strength such as plastic or steel slat. When using a C shaped channel member 66, the channel may be provided with spaced holes to which the mat is fastened by screws for rivets 68. In this arrangement, the edge 67 of the mat 34 is compressed between the upper and lower flanges 65 and 69 of channel 66. Flanges 65 and 69 preferably include correspondingly aligned holes to facilitate fastening of the mat within the channel. Alternatively, a suitable adhesive may be utilized and the channel 66 crimped at spaced locations.

It should be apparent that mat 34 may be affixed to its frame by any suitable means that serves to secure the mat to the inner frame 33. To minimize the possibility of danger to animals from tripping or splinters, the surface of the mat 34 should preferably be substantially flush as shown in FIG. 6.

At regular intervals along all four sides of the inner frame 33, the frame is fitted with right angle brackets 73 which project outward at intervals along all four sides. The number of brackets 73 and intervals between adjacent brackets may vary according to the size of the inner frame 33. Typically the spacing would be no less than 18", depending on the overall dimensions of the mat and inner frame assembly 32 and the desired strength. At a minimum, there would be provided at least one bracket 73 between a hinge and the end of a sectional frame member. Brackets 73 are attached to the lower floor side of the inner frame 33, and extend outward from the inner frame toward the stall wall. The bracket 73 then turns upwardly at a 90° angle, fitting flush with or close to any adjacent wall. The right angle portion of the brackets 73 preferably rise no higher than the height of the mat and frame assembly 32. The several brackets along each side of the inner frame 33, thus, form a virtual channel adapted to receive rigid bars 77, 78, 79 and 80 which, when assembled, make an outer frame 35. Bars 77–80 can also be hinged if desired, but only in such a fashion that they are held entirely rigid when in use. Each rigid bar is loosely received across two or more brackets 73 between the outside edge of the mat and inner frame assembly 32 and the upward projecting portion of a right angle bracket 73, and rests on the horizontal portion thereof.

Figure 11:
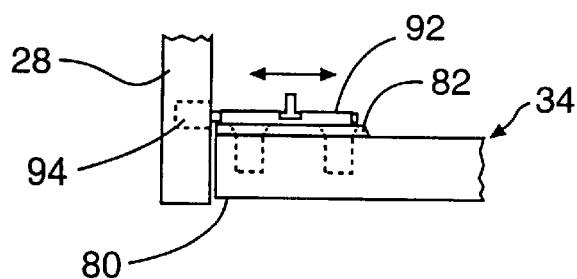
FIG. 11 is a fragmentary partially in cross section of a corner of the outer frame assembly illustrating a slide bolt mechanism for securing the outer frame assembly to a surrounding wall.

When assembled for use in a stall as shown in FIG. 9, the mat and inner frame assembly 32 are surrounded by four removable rigid framing bars 77, 78, 79 and 80 which rest on or are fitted into the side brackets 73 attached to and extending outward of the mat and frame assembly 32. The upward extending portions of the brackets 73 are spaced from the ends and sides of the inner frame members so as to accommodate the bars of the outer frame 35. As in the case of the members which make up the inner frame 33, the rigid framing bars 77–80 are approximately ½" to 1" in height, but could be greater in height, if required to match the height of the inner frame pieces to thereby provide a reasonably contiguous walking surface between the mat and inner frame assembly 32 and the outer frame 35. The framing bars 77–80 are approximately 1"–3" wide, depending on the distance to be spanned between the outside of the inner frame 33 and any surrounding walls, and depending on the dimensions required to achieve the desired strength with the material chosen for a particular application. When assembled in place in the virtual channels formed by the brackets attached to the inner frame 33, the four rigid bars serve to enclose the mat and frame assembly 32 and maintain it firmly in the stall 16. The four rigid bars 77–80 may be permanently fastened to each other at any or all corners to form an outer frame 35 surrounding the mat and inner frame assembly 32. The outer frame 35 can be held in place in the stall 16 by slide bolt mechanisms 93 affixed to ends or corners of the outer frame 35. When extended, the slide bolt mechanisms cooperate with corresponding apertures in the stall walls 20, 22, 24 and 25 or any vertical post 28, as illustrated in FIG. 11.

In an alternative embodiment, the outer frame members may be left unfastened to each other, but shorter end pieces 77 and 79 can each include at each of their respective ends plate extensions 81, 82 and 83, 84, respectively, and slide bolt mechanism 93. These plates and slide bolts lie over and extend beyond the side traverse bars 78, 80 to fit into appropriately aligned apertures 94 in surrounding stall walls 20, 22, 24 or 25, or may cooperate with an aperture 94 in an associated corner vertical post 28. To secure the entire mat and frame assembly 32 and the outer frame 35 within a stall 16, the plates 81, 83 and slide bolt 92 on rigid bars 77, 79 may simply rest over the surface of the ends of the longitudinal rigid bars 78, 80, which simply run the length of the stall wall or they can be conveniently pinned together. When the slide bolts 92 are in their extended positions engaging an aperture, the outer frame 35 is held secure in the stall with the outer frame 35 positively clamping the mat and inner frame assembly 32 within the stall. In another embodiment, the outer frame 35 may consist of as few as two rigid side outer frame bars 78, 80 (shown in FIG. 2) to be placed in the virtual channels along the parallel hinged sides of the mat and frame assembly 32. Each such rigid bar is fitted at one end with a plate extension 81, and at the other end with a slide bolt 92. The plate extensions 81 and slide bolts 92 cooperate with aligned apertures in surrounding walls or corner posts and extensions 81 may be provided with an aperture 91 to receive a lock pin. In this embodiment, the mat and frame assembly 32 has no virtual channel on its parallel end sides 48, 50, which are fitted flush to the surrounding walls instead of allowing room for the brackets forming a virtual channel.

For convenience and ease of illustration, the two side bars 78, 80 and two end bars 77, 79 of the outer frame 35 are shown in FIG. 9 spaced from the mat and inner frame assembly 32 and in their relative, but disassembled position.

To remove the inner frame and mat assembly 32 from the stall 16, it is first necessary to withdraw any slide bolts and pins from any corresponding apertures. The next step is to remove the end framing bars 77, 79, if any, and the side framing bars 78, 80. Once the rigid bars are removed and placed aside, the mat and inner frame assembly 32 can be folded and lifted from the stall 16 for cleaning.

To facilitate removal of the mat and frame assembly 32 from the stall 16, adjacent each corner of the inner frame 33 there is provided a ring or hook 90 which enables the mat and inner frame assembly 32 to be held in a folded position by means of one or more straps 100. As shown in FIG. 4, straps 100 or equivalent fastening devices such as, for example, buckles, hooks, bungee cords and the like, can be attached along the sides and end of the mat and inner frame assembly 32 to prevent the assembly from unfolding during transport. Straps 100 or rings 90 can also be used to receive overhead cables which may be used to assist in removing the mat and inner frame assembly 32 from the stall 16.

To this end, barn 10 may be provided with an overhead rail 102 from which is suspended a motor operated cable lifting mechanism 104. The mechanism includes wheels 106 which ride along the top lower inner surface 107 of an I-beam. Wheels 106 are journaled in housing 108 which supports a motor 109 and motor driven pulley 110. A chain or rope 111 depends from the pulley 110 through an opening (not shown) in the housing and includes and hook 113 at its end thereof. The hook 113 is adapted to engage one of the rings 90 or a supporting cable which is passed through two or more of the rings on the inner frame 33. A depending control box 112 enables the operator to raise or lower the cable and control the position of the cable mechanism 104 along the rail 102.

In operation, the cable is lowered to a position sufficient to allow the hook 113 to engage a strap or cable which extends through a pair of rings and loops across the folded mat and inner frame assembly 32. The control is operated to cause the pulley to raise the hook(s) and attached mat and inner frame assembly 32 which is then moved outward to the center of the barn 10 and thereafter to either end of the barn where it is taken outside and opened so waste may be conveniently disposed of and the mat and inner frame assembly 32 washed clean if desired for further use after drying, or the waste and the assembly may all be disposed of.

While the preferred forms and embodiments of the invention have been illustrated and described, it will be apparent to those of ordinary skill in the art that various changes and modifications may be made without deviating from the inventive concepts and true spirit of the invention as set forth above, and it is intended by the appended claims to define all such concepts and embodiments which come within the full scope and true spirit of the invention.

I claim:

1. Solid and liquid waste collection and disposal apparatus comprising a mat, an inner frame enclosing said mat, said inner frame and mat being foldable between opposite ends, said inner frame having attachment means at opposite ends for securing the inner frame in a folded position, and an outer frame adapted to be removably affixed to said inner frame and affixing said inner frame and mat in the area of use.

2. Solid and liquid waste collection and disposal apparatus as set forth in claim 1, wherein said mat includes a liquid-absorbing upper surface.

3. Solid and liquid waste collection and disposal apparatus as set forth in claim 2, wherein said mat further includes a moisture barrier lower surface.

4. Solid and liquid waste collection and disposal apparatus as set forth in claim 3, wherein said upper surface is a non-woven polypropylene.

5. Solid and liquid waste collection and disposal apparatus as set forth in claim 4, wherein the moisture barrier is an elastomeric sealant adapted to minimize escape of liquids from the mat.

6. Solid and liquid waste collection and disposal apparatus as set forth in claim 3, wherein said mat includes a liquid absorbing textile material as the upper surface and moisture barrier as the lower surface.

7. Solid and liquid waste collection and disposal apparatus comprising an inner frame, a mat enclosed by said inner frame and an outer frame for enclosing said inner frame, said inner frame having side brackets forming virtual channels, said outer frame including first and second rigid bars, said first rigid bars adapted to be removably received in said channels, second rigid bars being removably supported on said first rigid bars to form the enclosing outer frame and means for securing said first and second rigid bars to each other to form a rigid outer frame about the inner frame and mat.

8. Solid and liquid waste collection and disposal apparatus as set forth in claim 7, wherein at least a part of said first and second rigid bars are removably disposed in said brackets and, when in said brackets, said rigid bars being disposed to provide with said inner frame a substantially flat walking surface contiguous to the surface of the mat.

9. Solid and liquid waste collection and disposal apparatus as set forth in claim 7, wherein said outer frame includes means for attaching the outer frame to walls of a livestock stall.

10. Solid and liquid waste collection and disposal apparatus as set forth in claim 7, wherein said mat includes a liquid-absorbing upper surface.

11. Solid and liquid waste collection and disposal apparatus as set forth in claim 10, wherein said mat further includes a moisture barrier lower surface.

12. Solid and liquid waste collection and disposal apparatus as set forth in claim 10, wherein said upper surface of the mat is a non-woven polypropylene.

13. Solid and liquid waste collection and disposal apparatus as set forth in claim 10, wherein said inner frame and mat are foldable between opposite ends.

14. Solid and liquid waste collection and disposal apparatus as set forth in claim 13, wherein the moisture barrier is an elastomeric sealant adapted to minimize escape of liquids from the mat.

15. Solid and liquid waste collection apparatus as set forth in claim 7, wherein said inner frame and mat are foldable between opposite ends.

16. Solid and liquid waste collection and disposal apparatus as set forth in claim 15, wherein said inner frame includes attachment means at opposite ends for securing the inner frame in a folded position.

17. Solid and liquid waste collection and disposal apparatus as set forth in claim 16, wherein said inner frame further includes means at opposite ends to enable said inner frame to be lifted and removed from the stall by an overhead crane.

18. Solid and liquid waste collection and disposal apparatus as set forth in claim 16, wherein said mat includes a liquid absorbing upper surface.

19. Solid and liquid waste collection and disposal apparatus as set forth in claim 16, wherein said mat further includes a moisture barrier lower surface.

* * * * *